Patented Sept. 3, 1935

2,013,523

UNITED STATES PATENT OFFICE 2,013,523

CRESYLIC ACID CONDENSATION PRODUCT AND PROCESS OF MAKING SAME

Izador J. Novak, Bridgeport, Conn., assignor to Raybestos-Manhattan, Inc., Bridgeport, Conn., a corporation of New Jersey No Drawing. Application August 13, 1932, Serial No. 628,773

5 Claims. (Cl. 260—4)

This application is a continuation in part of my co-pending application Serial No. 247,756, filed January 18, 1928.

This invention relates to cresylic acid condensation products and process of making same, and refers more particularly to the production of cresylic acid condensation products of the infusible type characterized by being perfectly soluble in solvents of the aromatic hydrocarbon series, for instance, benzol, toluol, xylol, and the like, as distinguished from resins requiring intermediate solvents and from mixtures of fusible resins with hardening agents.

The product of the present invention is adaptable for all the general uses of the potentially infusible resins known in the art and because of its solubility in solvents of a non-hygroscopic nature, is particularly adapted for those uses where a solvent of this nature confers added security from aqueous impurities such as, for instance, in electrical insulation. The quality of complete solubility in non-hygroscopic liquids is not a property per se of cresylic acid resins heretofore produced or described, and the present invention, therefore, has for its principal object the production of a cresylic acid resin capable of complete solubility in solvents of the aromatic hydrocarbon type.

It is well known in the art to dissolve phenolic resins of the infusible type in mixtures of solvents of which one constituent is benzol or a cyclic hydrocarbon, but these solutions are all characterized by the presence therein also of an oxygen-containing aliphatic material (intermediate) solvent which is indispensable to thorough solution of the phenolic resin. The aliphatic solvents which have been suggested are mainly alcohols or ketones which are generally very hygroscopic and mixtures containing them are therefore also hygroscopic. Also, in the drying of such solutions to leave the phenolic resin as residue a small portion of these solvents are tenaciously retained and the residue, therefore, is also slightly hygroscopic. This effect is eliminated by the present invention.

It is a further object, therefore, of this invention to produce a product containing a solvent characterized by being non-hygroscopic. A still further object of the invention is to provide a product having the characteristics described and to provide a novel process for accomplishing this object.

The utility of the invention as well as other objects and advantages will be hereinafter more particularly brought out.

I have discovered that this type of solubility is a characteristic of small, definite class of cresylic acid condensation products and is by no means general. For instance, phenol or hydroxy benzene is not satisfactory for use as a base material in producing these soluble resins. Also, catalysts such as the fixed bases, for instance, caustic soda and lime, neutral basic or acid salts, for instance, potassium sulfate, sodium sulfite, ammonium sulfate, and acids such as sulfuric and hydrochloric acids, when used in quantities to produce resins of the infusible type by methods previously described, do not form resinous condensation products which are or can be made into benzol-soluble products without the addition of auxiliary solvents. The commercial resins and the important resins described in the art are almost wholly of the type above described. Also, I have found that, even with the class of catalysts utilized in this invention, complete solubility is not inherent or developable unless the proportion of catalyst remaining in the reaction product is greater than a certain definite proportion. Furthermore, excess of catalyst is undesirable as it merely dilutes the properties of the finished hardened resin.

In general, the essentials for the production of my product are (1) the use of cresylic acid, (2) the use of formaldehyde or other bodies containing reactive methylene groups, (3) the use of amines in proportions between substantially .25 and .35 mole per mole of cresylic acid. These materials in conjunction and on reaction produce condensation products which are inherently benzol-soluble or can be made benzol-soluble by further heating whether in the primary reaction or in a subsequent reaction as will be described later.

In one embodiment of this invention I use the following ingredients:

| | Parts |
|---|---|
| Cresylic acid | 108 |
| Aniline | 31 |
| Paraform | 40 |

These are first mixed and then heated together in a closed autoclave until the reaction has commenced which will be evidenced by exothermic heating and the development of pressure within the autoclave. The external heat is then discontinued and the reaction allowed to go on of itself or even retarded by external cooling for a period of say 40 minutes or until from experience it is known that the reaction has proceeded to the stage which will be hereinafter described. The autoclave with its contents is then allowed to cool, the internal pressure released, if any still remains, and on opening a reaction product is found in the form of a viscous opaque yellow liquid accompanied by a small amount of supernatant aqueous liquid. This aqueous liquid is removed and the reaction product separated. At this point the reaction product is miscible with but not completely soluble in benzol. With small quantities of this reaction product I may carry out the solubilizing step as follows:

The liquid reaction product is heated to a temperature of about 250° F. and held at this temperature until it has become soluble in benzol, for example. During this heating period the first evidence of change occurs at about 200° F. when, by copius foaming, it is evident that water vapor is being eliminated. This foaming continues with less violence until a temperature of about 220° F. is reached, at which temperature all the water vapor has been evaporated and the liquid has become clear and yellow. As the temperature is raised to 250° F. the liquid begins to take on an orange color and it is noted by withdrawing and testing samples that its solubility in benzol is increasing. The color continues to deepen and the solubility to increase until finally at a characteristic deep red color it is noted that the material is completely and clearly soluble in benzol. At this point on cooling to room temperature the product is a brittle red solid. As soon as this stage has been reached the body of resin must be quickly cooled in order to prevent another further reaction which begins at this stage accompanied by exothermic heat and which, if allowed, would continue to the formation of a bubbly, vesicular, completely insoluble mass of no practical value for my purpose. By rapid cooling, however, it is possible to stop the reaction and prevent further reaction. When thoroughly cold this product is a red resin perfectly soluble in benzol with no need of intermediate solvents, cold or hot in all proportions and capable of rapid transformation solely by the application of heat to a hard infusible resinoid.

It will be appreciated by those familiar with this art that the preceding method is difficult of commercial application because of the necessity of exact observation and control and also the need of practically instantaneous cooling of the reaction product when it has reached the soluble stage in order to prevent further reaction. In order to operate commercially on the initial reaction product and to produce a condensation product completely soluble in the cyclic hydrocarbons I first dehydrate the initial reaction product by simply heating to about 220° F., at which point excessive foaming has ceased and the liquid is clear. I then introduce one-half the weight, more or less, of the reaction product of toluol or solvent naphtha and continue the heating under a reflux condenser until a sample of the liquid on drying off the solvent leaves a brittle resin. The same color changes as described in the first solubilizing method take place and these color changes may therefore be used as a test of the stage of solubility. By the use of a solvent in this manner I provide first a diluting and retarding agent which extends the hitherto delicate part of the reaction over a considerable period of time so that the process may be industrially controlled; second, I provide a safety factor in reducing or preventing the exothermic reaction described above because of the fact that such exothermic reaction will be expended in evaporating the solvent since, as is well known, such a mixture with solvents cannnot rise in temperature above the boiling point of the solvent until all the solvent has been evaporated; third, I eliminate the step of dissolving the dry, hard resin in the solvent and produce a varnish in one step. If it is desired to obtain the dry gum the solvent may be evaporated off by well known methods, as for instance, on a heated revolving drum provided with a scraper. It is understood that I may use any suitable cyclic hydrocarbon as a diluent, for this purpose. This solution is perfectly miscible with varnish oils, drying oils, et cetera.

As another example I may utilize the following ingredients:

| | Parts |
|---|---|
| Cresylic acid | 800 |
| 40% formaldehyde solution | 800 |
| 26° Baumé ammonia solution | 275 |

These are mixed and allowed to react in an open vessel without external heating for say one hour. The heat developed by the reaction between the formaldehyde and ammonia to form hexamethylenetetramin is sufficient to initiate the main reaction and cause it to proceed to the separation of an oily condensation product and a supernatant aqueous liquid. The oily condensation product at this stage contains about .35 mole of combined $NH_3$ per mole of cresylic acid. On separation from the watery layer it is found to be miscible with cyclic hydrocarbons such, for instance, as benzol, but incompletely soluble therein. In order to produce a completely soluble product I take this condensation product and heat it further to about 220° F. for the purpose of dehydration, and I further heat it at this temperature whereby it rapidly becomes soluble in cyclic hydrocarbons. At this stage it is a viscous amber colored liquid which may, if desired, be further hardened to a brittle resin without losing solubility. It will be noted that this is a two stage process since I have found it unsatisfactory and difficult of control to carry the reaction directly to the completely soluble stage as a continuous operation.

It is to be noted that if I operate to reduce the combined $NH_3$ in the condensation product above prepared to below .25 mole per mole of cresylic acid no further amount of heating will develop complete solubility in cyclic hydrocarbons. This limitation of the combined amine I have found to be true in all the work I have performed on different amines in connection with these benzol soluble condensation products.

It will be noted that in the first example shown above I prefer to retard the solubilizing of the initial condensation product by the use of a solvent diluent, whereas in the second example the initial condensation product may be heated directly to solubility. The difference in manipulation is a function of the difference in reactivity of the two condensation products, the first being rapidly reactive, and the second slowly reactive.

With regard to the primary constituents entering into these reactions to produce benzol-soluble condensation products of the infusible type, I have found that cresylic acid is suitable; that phenol is not suitable; formaldehyde, paraform, and in general, bodies containing reactive methylene groups are suitable; methyl amine, aniline, ammonia, and other amines in general are suitable.

While I have described certain proportions of ingredients in the examples above, it will be understood that I may use any proportions that I find suitable, with the exception that the proportion of amine contained in the soluble product of this invention must not be lower than approximately .25 mole of amine per mole of cresylic acid used, nor substantially greater than .35 mole, the upper limit being set by the point at which dilution of the resin by amine or amine condensation product largely reduces the speed of setting and hardness of the resin.

From the examples given above it is pointed out that the soluble products of this invention may vary from liquid to solid, depending upon the ingredients used, the proportions in which they are used, and the stage to which it is desired or necessary to carry the reaction to produce complete solubility. Also, and similarly to potentially infusible products of the prior art, the temporarily soluble and fusible character of the partial reaction products herein and previously known and described does not prevent them from becoming infusible and insoluble, in which state they have their greatest utility.

While I frequently refer to these products as being benzol-soluble, this term is intended to include generally the class of cyclic hydrocarbons and is not intended as a limitation.

I have described these condensation products as being completely soluble in cyclic hydrocarbons, but I have also found that they have similar solvent powers for other materials which are not simple solvents, but which also have a modifying action on the compositions resulting from heat treatment. Among these are China-wood oil, turpentine, rosin, rubber and various other gums, resins and pitches. These may be used in all proportions dependent on the modifying action desired in the final solidified product.

I claim as my invention:

1. A cresylic acid condensation product transformable by heat into an infusible body resulting from reaction between cresylic acid, a body containing a reactive methylene group in an amount at least equal to one mole per mole of said acid and a primary mono-amine, characterized by complete solubility in cold cyclic hydrocarbons and containing between substantially .25 and .35 mole of combined primary mono amine per mole of original cresylic acid used.

2. The process of producing condensation products which are completely soluble in cold cyclic hydrocarbon solvents and which are per se transformable by heat to an infusible state which comprises reacting cresylic acid, a substance containing a reactive methylene group in amount at least approximately equal to one mole per mole of cresylic acid and primary mono-amine in amount in excess of .25 mole of mono-amine per mole of cresylic acid to produce an initial oily reaction product incompletely soluble in cyclic hydrocarbons and a watery layer, removing said watery layer, and heating the remaining initial reaction product at a temperature above 200° F. to completely dehydrate the same and to further react said initial reaction product to produce a condensation product containing between substantially .25 and .35 mole combined mono-amine per mole of cresylic acid and completely soluble in cold cyclic hydrocarbons.

3. The process of producing condensation products which are completely soluble in cold cyclic hydrocarbon solvents and which are per se transformable by heat to an infusible state which comprises reacting cresylic acid, a substance containing a reactive methylene group in amount at least approximately equal to one mole per mole of cresylic acid and primary mono-amine in amount in excess of .25 mole of mono-amine per mole of cresylic acid to produce an initial oily reaction product incompletely soluble in cyclic hydrocarbons, and heating the remaining initial reaction product at a temperature above 200° F. to completely dehydrate the same and to further react said initial reaction product to produce a condensation product containing between substantially .25 and .35 combined mono-amine per mole of cresylic acid and completely soluble in cold cyclic hydrocarbons.

4. The process of producing condensation products which are completely soluble in cold cyclic hydrocarbon solvents and which are per se transformable by heat to an infusible state which comprises reacting cresylic acid, a substance containing a reactive methylene group in amount at least approximately equal to one mole per mole of cresylic acid and ammonia in amount in excess of .25 mole per mole of cresylic acid to produce an initial oily reaction product incompletely soluble in cyclic hydrocarbons and a watery layer, removing said watery layer, and heating the remaining initial reaction product at a temperature above 200° F. to completely dehydrate the same and to further react said initial reaction product to produce a condensation product containing between substantially .25 and .35 mole combined ammonia per mole of cresylic acid and completely soluble in cold cyclic hydrocarbons.

5. A condensation product transformable by heat into an infusible body and resulting from reaction between cresylic acid, a body containing a reactive methylene group in amount at least equal to one mole per mole of acid and ammonia, said product being characterized by complete solubility in cold cyclic hydrocarbons and containing between substantially .25 and .35 mole of combined ammonia per mole of original cresylic acid used.

IZADOR J. NOVAK.